United States Patent
Beutler

(10) Patent No.: US 9,839,975 B2
(45) Date of Patent: Dec. 12, 2017

(54) METHOD FOR CONFIGURING A LASER MACHINING MACHINE

(71) Applicant: Bystronic Laser AG, Niederoenz (CH)

(72) Inventor: Beat Beutler, Oberoenz (CH)

(73) Assignee: BYSTRONIC LASER AG, Niederoenz (CH)

( * ) Notice: Subject to any disclaimer, the term of this patent is extended or adjusted under 35 U.S.C. 154(b) by 416 days.

(21) Appl. No.: 14/568,172

(22) Filed: Dec. 12, 2014

(65) Prior Publication Data

US 2015/0165549 A1    Jun. 18, 2015

(30) Foreign Application Priority Data

Dec. 12, 2013   (EP) .................................... 13196912

(51) Int. Cl.
*B23K 26/03*       (2006.01)
*B23K 26/00*       (2014.01)
(Continued)

(52) U.S. Cl.
CPC .......... *B23K 26/03* (2013.01); *B23K 26/0066* (2013.01); *B23K 26/032* (2013.01);
(Continued)

(58) Field of Classification Search
CPC ........ B23K 26/03; B23K 26/00; B23K 26/02; G05B 19/4093; G05B 19/401; G05B 19/404
(Continued)

(56) References Cited

U.S. PATENT DOCUMENTS

| 3,423,593 A | 1/1969 | Chinnock |
|---|---|---|
| 3,590,840 A | 7/1971 | Hyer |

(Continued)

FOREIGN PATENT DOCUMENTS

| CN | 201220326 Y | 4/2009 |
|---|---|---|
| CN | 102117053 A | 7/2011 |

(Continued)

OTHER PUBLICATIONS

EPO search report and written opinion from priority EPO application EP13196912, dated Jul. 30, 2014 (in German).

(Continued)

*Primary Examiner* — Samuel M Heinrich
(74) *Attorney, Agent, or Firm* — Matthew B. Dernier, Esq.

(57) ABSTRACT

Methods for configuring laser machining machines (1) include control (2), whereby different types laser machining processes (A, B, C, D) can be executed using the laser machine (1), these processes being respectively controlled by the control apparatus (2) using process parameters. The processes of different types are categorized in a classification (20), in which a respective set of process parameters (21A-24A; 21B-24B; 21C-24C; 22D-24D), that are used during the execution of the respective process (A, B, C, D), is assigned to each process. During a determination and/or changing of a first process parameter (21A-24A) of a first process (A), a process parameter (S1-S6; 21B-24B; 21C-24C; 22D-24D) of a different process (B, C, D) that is contained within classification (20), is automatically determined and/or changed according to a stored rule, as a function of the first process parameter.

20 Claims, 5 Drawing Sheets

(51) Int. Cl.
  *B23K 26/36* (2014.01)
  *B23K 26/70* (2014.01)
  *G05B 19/406* (2006.01)
  *G05B 19/408* (2006.01)
  *B23K 26/21* (2014.01)

(52) U.S. Cl.
  CPC ............. *B23K 26/21* (2015.10); *B23K 26/36* (2013.01); *B23K 26/702* (2015.10); *G05B 19/406* (2013.01); *G05B 19/4083* (2013.01); *G05B 2219/35398* (2013.01); *G05B 2219/36086* (2013.01); *G05B 2219/36089* (2013.01); *G05B 2219/45041* (2013.01); *G05B 2219/45165* (2013.01)

(58) Field of Classification Search
  USPC .............. 219/121.6–121.72, 121.83, 121.85; 700/159, 166
  See application file for complete search history.

(56) References Cited

U.S. PATENT DOCUMENTS

| | | | |
|---|---|---|---|
| 3,692,414 | A | 9/1972 | Hosterman et al. |
| 3,736,402 | A | 5/1973 | Mefferd et al. |
| 3,843,865 | A | 10/1974 | Nath |
| 4,335,296 | A | 6/1982 | Bredow |
| 4,406,940 | A | 9/1983 | Tsutsumi |
| 4,427,873 | A | 1/1984 | Orita et al. |
| 4,634,832 | A | 1/1987 | Martyr |
| 4,644,128 | A | 2/1987 | Palentyn et al. |
| 4,668,088 | A | 5/1987 | Quinque et al. |
| 4,675,501 | A | 6/1987 | Klingel |
| 4,698,480 | A | 10/1987 | Klingel |
| 4,728,771 | A | 3/1988 | Sartorio |
| 4,772,772 | A | 9/1988 | Juptner et al. |
| 4,806,726 | A | 2/1989 | Rosa et al. |
| 4,940,880 | A | 7/1990 | Klingel et al. |
| 4,950,861 | A | 8/1990 | Erlenmaier et al. |
| 5,008,510 | A | 4/1991 | Koseki |
| 5,039,836 | A | 8/1991 | Lemelson |
| 5,045,668 | A | 9/1991 | Neiheisel et al. |
| 5,132,510 | A | 7/1992 | Klingel et al. |
| 5,272,312 | A | 12/1993 | Jurca |
| 5,304,773 | A | 4/1994 | Kilian et al. |
| 5,371,336 | A | 12/1994 | Albert et al. |
| 5,373,135 | A | 12/1994 | Beyer et al. |
| 5,463,202 | A | 10/1995 | Kurosawa et al. |
| 5,463,215 | A | 10/1995 | Alfille |
| 5,491,318 | A | 2/1996 | Sugawara et al. |
| 5,525,776 | A | 6/1996 | Okamoto |
| 5,548,098 | A | 8/1996 | Sugawara et al. |
| 5,667,707 | A | 9/1997 | Klingel et al. |
| 5,685,999 | A | 11/1997 | Wiedemann et al. |
| 5,698,120 | A | 12/1997 | Kurosawa et al. |
| 5,751,436 | A | 5/1998 | Kwon et al. |
| 5,886,319 | A | 3/1999 | Preston et al. |
| 5,915,316 | A | 6/1999 | Tajima et al. |
| 5,968,382 | A | 10/1999 | Matsumoto et al. |
| 5,969,335 | A | 10/1999 | Karasaki |
| 5,998,768 | A | 12/1999 | Hunter et al. |
| 6,031,200 | A | 2/2000 | Whitehouse |
| 6,040,549 | A | 3/2000 | Kanaoka |
| 6,044,308 | A | 3/2000 | Huissoon |
| 6,124,565 | A | 9/2000 | Morishita et al. |
| 6,188,041 | B1 | 2/2001 | Kim et al. |
| 6,204,473 | B1 | 3/2001 | Legge |
| 6,260,976 | B1 | 7/2001 | Endou et al. |
| 6,284,999 | B1 | 9/2001 | Virtanen et al. |
| 6,288,363 | B1 | 9/2001 | Kaga et al. |
| 6,300,592 | B1 | 10/2001 | Ulrich et al. |
| 6,316,743 | B1 | 11/2001 | Nagahori et al. |
| 6,326,586 | B1 | 12/2001 | Heyerick et al. |
| 6,376,798 | B1 | 4/2002 | Remue et al. |
| 6,392,192 | B1 | 5/2002 | Cole et al. |
| 6,393,687 | B1 | 5/2002 | Friedrich |
| 6,417,487 | B2 | 7/2002 | Nagura et al. |
| 6,419,146 | B1 | 7/2002 | Buldhaupt et al. |
| 6,455,807 | B1 | 9/2002 | Scott |
| 6,462,301 | B1 | 10/2002 | Scott et al. |
| 6,528,762 | B2 | 3/2003 | Mayer |
| 6,588,738 | B1 | 7/2003 | Sukuvaara et al. |
| 6,649,866 | B2 | 11/2003 | Reichmann et al. |
| 6,670,574 | B1 | 12/2003 | Bates et al. |
| 6,693,256 | B2 | 2/2004 | Furujo et al. |
| 6,777,641 | B2 | 8/2004 | Cole et al. |
| 6,777,646 | B2 | 8/2004 | Schubert |
| 6,822,187 | B1 | 11/2004 | Hermann et al. |
| 6,833,911 | B2 | 12/2004 | Lizotte |
| 6,886,284 | B2 | 5/2005 | Lizotte |
| 6,934,014 | B1 | 8/2005 | Kleinhuber |
| 7,005,606 | B2 | 2/2006 | Legge et al. |
| 7,038,166 | B2 | 5/2006 | Denney et al. |
| 7,060,932 | B2 | 6/2006 | Denney et al. |
| 7,124,420 | B2 | 10/2006 | Murata et al. |
| 7,180,920 | B2 | 2/2007 | Denney et al. |
| 7,286,223 | B2 | 10/2007 | Denney et al. |
| 7,289,206 | B2 | 10/2007 | Denney et al. |
| 7,324,861 | B1 * | 1/2008 | Zheng .................. H05K 3/1225 700/117 |
| 7,345,257 | B2 | 3/2008 | Yamazaki et al. |
| 7,379,483 | B2 | 5/2008 | Denney et al. |
| 7,407,861 | B2 | 8/2008 | Couch et al. |
| 7,492,453 | B2 | 2/2009 | Denney et al. |
| 7,505,504 | B2 | 3/2009 | Sakai et al. |
| 7,528,344 | B2 | 5/2009 | Horn et al. |
| 7,570,443 | B2 | 8/2009 | Blasenheim et al. |
| 7,620,085 | B2 | 11/2009 | Denney et al. |
| 7,667,159 | B2 | 2/2010 | Pailthorp et al. |
| 7,848,552 | B2 | 12/2010 | Schutze et al. |
| 7,864,315 | B2 | 1/2011 | Denney et al. |
| 7,880,114 | B2 | 2/2011 | Denney et al. |
| 7,880,877 | B2 | 2/2011 | Denney et al. |
| 8,040,619 | B2 | 10/2011 | Blasenheim et al. |
| 8,049,132 | B2 | 11/2011 | Bouet et al. |
| 8,094,303 | B2 | 1/2012 | Denney et al. |
| RE43,400 | E | 5/2012 | O'Brien et al. |
| RE43,487 | E | 6/2012 | O'Brien et al. |
| 8,198,566 | B2 | 6/2012 | Baird |
| 8,217,301 | B2 | 7/2012 | Schmauder et al. |
| 8,228,501 | B2 | 7/2012 | Denney et al. |
| RE43,605 | E | 8/2012 | O'Brien et al. |
| 8,258,425 | B2 | 9/2012 | Denney et al. |
| 8,306,079 | B2 | 11/2012 | Denney et al. |
| 8,314,361 | B2 | 11/2012 | Harnisch et al. |
| 8,338,743 | B2 | 12/2012 | Wanner et al. |
| 8,383,980 | B2 | 2/2013 | Yamazaki et al. |
| 8,439,811 | B2 | 5/2013 | Erlenmaier et al. |
| 8,519,299 | B2 | 8/2013 | Schmauder et al. |
| 8,558,135 | B2 * | 10/2013 | Calefati ................. B23K 26/03 219/121.62 |
| 8,624,158 | B2 | 1/2014 | Denney et al. |
| 8,638,509 | B2 | 1/2014 | Blasenheim et al. |
| 8,710,398 | B2 | 4/2014 | Boynton et al. |
| 9,289,852 | B2 | 3/2016 | Luedi et al. |
| 9,296,067 | B2 | 3/2016 | Cathry et al. |
| 2002/0177288 | A1 | 11/2002 | Brown et al. |
| 2003/0006221 | A1 | 1/2003 | Hong et al. |
| 2003/0014895 | A1 | 1/2003 | Lizotte |
| 2003/0045964 | A1 * | 3/2003 | Lottgen ................. G05B 19/409 700/180 |
| 2003/0183608 | A1 | 10/2003 | Yamazaki et al. |
| 2003/0192865 | A1 | 10/2003 | Cole et al. |
| 2003/0204283 | A1 | 10/2003 | Picard et al. |
| 2003/0234242 | A1 | 12/2003 | McCoy |
| 2003/0234243 | A1 | 12/2003 | McCoy |
| 2003/0234244 | A1 | 12/2003 | McCoy |
| 2004/0027630 | A1 | 2/2004 | Lizotte |
| 2004/0029362 | A1 | 2/2004 | Liu |
| 2004/0182839 | A1 | 9/2004 | Denney et al. |
| 2004/0182840 | A1 | 9/2004 | Denney et al. |
| 2004/0182841 | A1 | 9/2004 | Denney et al. |
| 2004/0182842 | A1 | 9/2004 | Denney et al. |
| 2004/0182998 | A1 | 9/2004 | Denney et al. |

(56) References Cited

U.S. PATENT DOCUMENTS

| | | |
|---|---|---|
| 2004/0182999 A1 | 9/2004 | Denney et al. |
| 2004/0208212 A1 | 10/2004 | Denney et al. |
| 2005/0017156 A1 | 1/2005 | Ehrmann et al. |
| 2005/0040150 A1 | 2/2005 | Denney et al. |
| 2005/0051523 A1 | 3/2005 | Legge et al. |
| 2005/0062583 A1 | 3/2005 | Naumov et al. |
| 2005/0098547 A1 | 5/2005 | Cali et al. |
| 2005/0109738 A1 | 5/2005 | Hewett et al. |
| 2005/0167403 A1 | 8/2005 | Petring |
| 2005/0213881 A1 | 9/2005 | Leclerc et al. |
| 2006/0049158 A1 | 3/2006 | Schurmann et al. |
| 2006/0144834 A1 | 7/2006 | Denney et al. |
| 2007/0075050 A1 | 4/2007 | Heyl |
| 2007/0075060 A1 | 4/2007 | Shedlov et al. |
| 2007/0088409 A1 | 4/2007 | Bischoff et al. |
| 2007/0119829 A1 | 5/2007 | Vietz et al. |
| 2007/0193987 A1 | 8/2007 | Bischoff et al. |
| 2007/0193988 A1 | 8/2007 | DeVerclos et al. |
| 2007/0228025 A1 | 10/2007 | Horn et al. |
| 2007/0284345 A1 | 12/2007 | Ando et al. |
| 2008/0000888 A1 | 1/2008 | Schulz et al. |
| 2008/0031298 A1 | 2/2008 | Sakai et al. |
| 2008/0067331 A1 | 3/2008 | Denney et al. |
| 2008/0212623 A1 | 9/2008 | Bischoff et al. |
| 2009/0001063 A1 | 1/2009 | Weick et al. |
| 2009/0021731 A1 | 1/2009 | Denney et al. |
| 2009/0057283 A1 | 3/2009 | Schmauder et al. |
| 2009/0152249 A1 | 6/2009 | Petro et al. |
| 2009/0181838 A1 | 7/2009 | Schmauder et al. |
| 2009/0240368 A1 | 9/2009 | Young, Jr. et al. |
| 2009/0284739 A1 | 11/2009 | Denney et al. |
| 2010/0044353 A1 | 2/2010 | Olsen |
| 2010/0071220 A1 | 3/2010 | Thompson et al. |
| 2010/0134628 A1 | 6/2010 | Pfitzner et al. |
| 2010/0176103 A1 | 7/2010 | Schulz et al. |
| 2010/0188669 A1 | 7/2010 | Rushford |
| 2011/0102789 A1 | 5/2011 | Denney et al. |
| 2011/0210107 A1 | 9/2011 | Hammann et al. |
| 2011/0266262 A1 | 11/2011 | Denney et al. |
| 2011/0287607 A1 | 11/2011 | Osako et al. |
| 2012/0145687 A1 | 6/2012 | Wolfel |
| 2012/0228274 A1 | 9/2012 | Schmauder et al. |
| 2013/0068738 A1 | 3/2013 | Schurmann et al. |
| 2013/0112671 A1 | 5/2013 | Cathry et al. |
| 2013/0126489 A1 | 5/2013 | Buschulte |
| 2013/0134141 A1 | 5/2013 | Santner et al. |
| 2013/0146569 A1 | 6/2013 | Woods et al. |
| 2013/0184839 A1 | 7/2013 | Bauer et al. |
| 2013/0319980 A1 | 12/2013 | Hesse et al. |
| 2014/0034614 A1 | 2/2014 | Sbetti et al. |
| 2015/0069028 A1 | 3/2015 | Jennings et al. |

FOREIGN PATENT DOCUMENTS

| | | | |
|---|---|---|---|
| CN | 102855326 A | 1/2013 | |
| DE | 8710866 U1 | 12/1988 | |
| DE | 4201640 C1 | 2/1993 | |
| DE | 10150129 C1 | 4/2003 | |
| DE | 102007013623 A1 | 10/2008 | |
| DE | 102007048471 A1 | 4/2009 | |
| DE | 102008052592 A1 | 4/2010 | |
| DE | 102009044751 A1 | 6/2010 | |
| EP | 0597771 A1 | 5/1994 | |
| EP | 0680805 B1 | 1/2001 | |
| EP | 0991493 B1 | 7/2004 | |
| EP | 1561538 A1 | 8/2005 | |
| EP | 1600248 A2 | 11/2005 | |
| EP | 1634673 A1 | 3/2006 | |
| EP | 1693141 A2 | 8/2006 | |
| EP | 1693141 A3 | 7/2008 | |
| EP | 1967316 A1 | 9/2008 | |
| EP | 1600248 A3 | 10/2008 | |
| EP | 2169491 A1 | 3/2010 | |
| EP | 2243557 A1 | 10/2010 | |
| EP | 1574485 B1 | 3/2013 | |
| JP | S56-041092 A | 4/1981 | |
| JP | H03-027889 A | 2/1991 | |
| JP | H07-144289 A | 6/1995 | |
| JP | H09-076084 A | 3/1997 | |
| JP | H10-249566 A | 9/1998 | |
| JP | H11-077356 A | 3/1999 | |
| JP | 2009-129513 A | 6/2009 | |
| JP | 2011183455 A * | 9/2011 | ............ B23K 26/03 |
| KR | 100699247 B1 | 3/2007 | |
| WO | 97/07928 A1 | 3/1977 | |
| WO | 02/080081 A1 | 10/2002 | |
| WO | 02/100587 A1 | 12/2002 | |
| WO | 03/002289 A1 | 1/2003 | |
| WO | 2004/087362 A2 | 10/2004 | |
| WO | 2006/031577 A2 | 3/2006 | |
| WO | 2006/138605 A2 | 12/2006 | |
| WO | 2008/052591 A1 | 5/2008 | |
| WO | 2009/007708 A2 | 1/2009 | |
| WO | 2009/014307 A1 | 1/2009 | |
| WO | 2009/157034 A1 | 12/2009 | |
| WO | 2011/035888 A1 | 3/2011 | |
| WO | 2011/051567 A2 | 5/2011 | |
| WO | 2011/083087 A1 | 7/2011 | |
| WO | 2011/083205 A1 | 7/2011 | |
| WO | 2012/000995 A1 | 1/2012 | |
| WO | 2012/080883 A1 | 6/2012 | |
| WO | 2012/101533 A1 | 8/2012 | |

OTHER PUBLICATIONS

Copending commonly-owned U.S. Appl. No. 13/952,571.
Copending commonly-owned U.S. Appl. No. 13/947,060.
Copending commonly-owned U.S. Appl. No. 13/703,723.

* cited by examiner

|   | A   | B   | C   | D   | ... |
|---|-----|-----|-----|-----|-----|
| 21 | *21A* | 21B | 21C | 21D | ... |
| 22 | *22A* | 22B | 22C | 22D | ... |
| 23 | *23A* | 23B | 23C | 23D | ... |
| 24 | *24A* | 24B | 24C | 24D | ... |
| ... | ... | ... | ... | ... | ... |

METHOD FOR CONFIGURING A LASER MACHINING MACHINE

This application claims benefit of priority to prior European application no. EP13196912 filed on Dec. 12, 2013, and the entirety of this European application no. EP13196912 is expressly incorporated herein by reference in its entirety and as to all its parts, for all intents and purposes, as if identically set forth in full herein.

BACKGROUND

The invention relates to a method for configuring a laser machining machine, a laser machining method, as well as a laser machining machine.

WO 2011/083087A1 discloses a cognitive system in connection with laser welding among other things, in which a later working process is carried out autonomously by the system in an unknown situation on the basis of learned empirical knowledge by adapting this learned knowledge. To this end, sensor information about the initial working of an original workpiece is abstracted and used. In the context of a first test run, expert knowledge can be used in order to teach the system.

CN102855326A discloses a method for managing laser cutting parameters. In this case, algorithms and correlation analyses are used in order to obtain an optimisation of the laser cutting quality.

WO2012000995A1 discloses a dialogue system for investigating a machining process carried out on a machine tool, in order to determine a suggestion for improving at least one quality feature of a subsequent machining process. The dialogue system comprises a suggestion module, which creates a suggestion by accessing stored expert knowledge. In this case, data or image data of a machined workpiece determined by a machine-tool sensor system are read in.

EP0991493B1 discloses a support system for a laser beam machine with an input device, which makes it possible for the user to input a plurality of analysis parameters relating to a machining state of a workpiece. Estimated values for machining state parameters can be created using an 'artificial intelligence function'. In this case, the parameter that is most effective in changing the previously input machining state can be selected.

DE102008052592A1 discloses a device for controlling a machining installation. Standard machining programs, which a control program accesses, are stored in a data memory. The machining parameters can be adapted in a pre-set manner to the material characteristics of a workpiece that is to be machined and/or to a selectable target size of the machining using an adapting apparatus. It furthermore discloses that suitable machining parameters for all relevant sizes, which enable process-reliable machining, are stored in technology tables according to the material type, the material thickness and the machining method. The adapting apparatus only enables a limited adaptation of parameters; as before, such a system requires comprehensive expert knowledge and constant vigilance of an operator, particularly if the type of laser machining is changed.

EP2169491A1 discloses a support system for optimising machining and/or control parameters.

The disadvantage of these known solutions lies in particular in the fact that operators are confronted with a multiplicity of process parameters, the setting of which, to achieve a high-quality machining, lies within their scope of duties. This not only requires significant expert knowledge, but is time-consuming. In addition, incorrect settings owing to the mixing up of parameters are not excluded. The high number of process parameters results, because the laser machining installations may be used very versatilely and may handle applications that are very different from one another. For machining one and the same workpiece, different values are used as a basis for the same parameter type depending on the operating mode (e.g., continuous laser radiation, pulsed laser radiation, engraving, cutting, etc.).

A further disadvantage of these known solutions lies in particular in the fact that an individual setting of optimal process parameters by the operating personnel is not possible. The process parameters are changed during the laser machining process without the operating personnel being able to have an influence, or being able to check the adjustment of the process parameters, or being able to check the plausibility thereof. Depending on the use case, a plurality of different values for process parameters or combinations of process parameters may also come into question. An adaptation to the actual case, the workpiece, or the type of intended machining is therefore not possible. Also, increasing contamination of the laser optics, wear of components and the 'drifting away' of controllers cannot be accounted for with such systems, so that in such situations, optimal results cannot be achieved.

SUMMARY

It is therefore within the scope of the present disclosure to overcome these disadvantages and to provide a configuration method and a laser machining method and machine, respectively, through which the setting of process parameters is substantially facilitated and more reliably organised. The time outlay for the configuration of laser machining machines should be noticeably reduced, and incorrect setting should be excluded to the extent possible.

Within the scope of the present disclosure it should be possible in all (also unforeseen) situations to use optimum process parameters. The system should be distinguished by a high flexibility and by enablement of the operating personnel to make correct decisions, in order to obtain an optimized machining quality. It should be possible to deal correctly with (undesired) influences, which are not detected by the system itself or are fundamentally not detectable, by using a system according to the present disclosure.

This object is achieved using the configuration method mentioned within the present disclosure, in that the laser machining processes of different types are categorized in a classification, in which a set of process parameters, that are used during the execution of the relevant laser machining process, is assigned to each laser machining process. Thus, during a determination and/or changing of at least one first process parameter of a laser machining process, at least one process parameter of a different laser machining process, that is contained in the classification, is automatically determined and/or changed in accordance with at least one stored rule as a function of the first process parameter.

The configuration or setting of the process parameters is substantially automated by this measure, as a result of which the operation may be considerably simplified.

For workpieces of the same thickness and/or the same material, a complete set of process parameters may be generated thereby in a particularly simple manner. If, for example, the process parameters for the uninterrupted straight cut with continuous laser power are determined or changed, the process parameters, on which the other machining modes are based, are also automatically determined or changed on the basis of these values. For example, these machining modes may be: cutting pulsed contours, engraving, vaporisation, cutting small contours with continuous laser power, starting the contour, scanning, as well as others.

Different parameters are to be used in turn for piercing, engraving, cutting and/or vaporization. It has been shown that for optimum machining of workpieces of the same type (thickness, material, shape, etc.) using different machining modes, relationships exist between the respective process parameters. The present invention is based on these relationships, in the sense that stored rules map these relationships.

Under the present disclosure, the configuration, the determination or the changing of the at least one process parameter takes place in a class-overarching manner, as the first process parameter belongs to a different class (the classification) from the process parameter determined or changed as a function of this first process parameter. Thus, the laser machining processes of different types form classes in each case: one laser process of a first type forms a first class of the classification; a laser process of a second type forms a second class of the classification. The first type differs from the second type, respectively. Further laser processes of different types can form further classes, respectively.

It is preferred if the laser process of the first type (forming the first class of the classification) be different from the laser process of the second type (forming the second class of the classification) through the temporal curve or the temporal sequence of the laser radiation.

It is particularly preferred if the laser process of the first type (forming the first class of the classification) be characterized by continuous laser radiation (CW) and the laser process of the second type (forming the second class of the classification) be characterised by pulsed laser radiation.

If, for example, the operator changes the "focus position" parameter during CW machining (which forms a class of the classification), the focus positions are automatically changed, in accordance with stored rules, in the other classes of the classification as well. This may, for example, lead to the focus position during pulsed operation or 'engraving' also being adjusted by a certain amount. In the method according to the invention, in the event of a change or determination of a first parameter (that is assigned to a certain process type), parameters of different process types are influenced in an automated manner. Thus, various machining types (CW, pulsed, cutting, engraving, vaporization, etc.) are automatically optimised by this class-overarching method in accordance with stored rules.

The present disclosure permits different machining processes or machining processes belonging to different classes (i.e., processes that differ in terms of quality) on the same workpiece, e.g. sheet metal, to be adjusted automatically and in a class-overarching manner, when an operator changes a first process parameter. This substantially differentiates the present disclosure from the patent publication documents mentioned at the beginning, as not only may faults be prevented in this manner (comprehensive class-overarching 'expert knowledge' is stored in the machining machine), but furthermore, the operation is also facilitated for the customer both substantially and qualitatively.

The expression 'classification' as herein employed is to be understood broadly and in its most general form, as meaning a respective assignment of process parameters to certain laser machining processes, respectively. For example, the use of a table-like structure of the process parameters (e.g., cutting parameters) is possible. The rows describe the type of the parameter, such as, for example, cutting speed, focus position, laser power, etc. The columns are reserved for various process types (hereinafter: laser machining processes of different types).

An example follows: The table may, for example, consist of approx. 60 rows and 8 columns, which theoretically gives 480 setting options for each sheet thickness and grade. However, not all parameters are equally important for the customer. And it has been shown that a multiplicity of these parameters have a relationship to one another. Example: If the focus position in column 1 must be changed, all other focus positions in columns 2-8 are likewise to be changed in accordance with fixed rules. This relationship may then be stored as expert knowledge (at least one stored rule) in the control.

Naturally, it is preferred if a multiplicity of rules are stored, as a result of which a corresponding multiplicity of process parameters depend on one another.

An aspect of the present invention lies in the fact that two types of process parameters are defined in the classification: primary and secondary parameters: The primary parameters are determined or changed by the operator or by the laser machining machine in accordance with certain quality criteria and/or sensor data. The secondary parameters depend on the primary parameters and are determined and/or changed in accordance with the stored rules.

The primary parameters are the more important ones, that must be changed often, in order to optimize the machining or cutting result. In normal uses, only 5-10 parameters are to be classified as primary parameters. The secondary parameters have a relationship to the primary parameters. If a primary parameter is changed, one or a plurality of secondary parameters are changed according to stored rules. The rules map the expert knowledge. The operation of the installation is massively simplified by using this solution.

The stored rules may be saved in the control or on an external memory. The rules can also be changed. Likewise, the definition of which process parameter is primary parameter or secondary parameter may be changed. The stored rules may be formulae or else also constants.

The primary and secondary parameters may be used on the laser cutting installation not only during the cutting process, but also during piercing and further possible uses.

The control apparatus of the laser machining machine is constructed in such a manner that it can manage primary and secondary parameters. Following a change of a primary parameter, the secondary parameters are automatically calculated by the stored expert system, which comprises the multiplicity of rules. The secondary parameters may be automatically saved as new parameters on the control apparatus and/or at a memory location. As a result, it is also ensured that simulations/calculations are carried out using correct values.

The primary parameters may be linked on the output apparatus of the user interface by images of workpieces of different machining quality. The operator only has to compare their cut part or the cut surface or the piercing, etc., with the image on the monitor, and press or select the closest or best-matching one. This triggers a change of a primary parameter in the control, and, via the stored rules, also one or a plurality of adjustments of secondary parameters. As a result, to the greatest extent possible, the expert knowledge is removed from the user and transferred to the control.

Limits for the process parameters, specifically for the primary parameters may be stored in an expert system. If these limits are exceeded, the system suggests measures on the basis of stored expert knowledge. For example, if the focus position is changed to too great an extent, this points to a contamination of the cutting lens. From this comes the recommendation to the operator to clean the lens.

The expert system of the primary and secondary parameters may be constructed in such a manner that, for example, a sensor apparatus effects an automatic change of primary parameters from a process observation in interaction with the control device. As a result, one or a plurality of secondary parameters are automatically changed in accordance with the stored rules.

A preferred version is distinguished in that the classification as laser machining processes of different types includes at least one laser machining process using continuous laser radiation and one laser machining process using pulsed laser radiation; and/or in that the classification as laser machining processes of different types includes the cutting, and/or engraving, and/or scanning, and/or vaporization, and/or continuous cutting of small contours.

A preferred version is distinguished in that the set of process parameters assigned to each laser processing process includes the process parameters focus position and/or feed rate and/or laser power and/or nozzle distance from the workpiece, and/or in that the at least one stored rule can preferably be changed by means of an input interface.

A preferred version is distinguished in that the determination and/or changing of at least one first process parameter takes place via an input, on an input interface of the laser machining machine, by an operator. Starting from the input relating to a primary parameter, all secondary parameters depending thereon are automatically calculated and stored as a data set.

A preferred version is distinguished in that a plurality of images of workpieces of different machining quality are displayed on an output interface of the laser machining machine, each image being assigned to a certain value at least of a first process parameter and in that the determination and/or changing of the at least one first process parameter takes place by selection of one of the images by an operator. This constitutes a particularly user-friendly solution, which is furthermore distinguished by high reliability in discovering an optimum (primary) parameter.

A preferred version is distinguished in that the determination and/or changing of at least one first process parameter takes place as a function of sensor data of a sensor apparatus. The assessment by an operator is here replaced or extended.

The present disclosure also achieves via a laser machining method for machining a workpiece using a laser beam in a laser machining machine, the steps:
configuration of the laser machining machine according to one of the preceding embodiments,
control of a laser machining process with a control apparatus using process parameters.
A preferred version is characterised by the steps:
monitoring of the laser machining process and/or inspection of the machined workpiece using at least one sensor apparatus,
creation of at least one suggestion for the changing of the at least one first process parameter as a function of the sensor data recorded by the at least one sensor apparatus, and,
provision of the suggestion for the changing of the process parameter at an output interface for the operating personnel.

In this version, the system initially generates a suggestion for the changing of a process parameter. This suggestion may contain information about the absolute value of an optimum process parameter determined by the system, or information about a relative value that indicates the deviation of an optimum process parameter from the currently set process parameter (i.e., on which the control is based). Likewise, the suggestion could possibly contain the information to increase or to reduce the process parameter.

The generation of a suggestion takes place during a laser machining process (e.g., after the piercing or after a first cutting phase). The operating personnel is then free to accept the suggestion, or to input a value that deviates from the suggestion for the relevant process parameter (and therefore make it the basis of the control), or to do absolutely nothing and to continue the machining process using the originally set process parameter. It is made possible for the user to engage in the process in a qualified manner. Thus, the option is presented to change a process parameter upon which the control of the laser machining process is based, in order to obtain optimum results.

The system on the one hand provides the operating personnel with instructions (i.e., guidelines that the system considers optimum), but at the same time offers them the freedom to set process parameters in a different way starting from the suggestion. In special situations that, for example, relate to particular workpiece types or shapes, particular machining results, and/or undesired influences such as contamination of the laser optics, the operator may undertake a further optimization of the suggested values, for example employing experience and/or intuition. It is also conceivable that the system determine a plurality of different suggestions for one and the same process parameter, and the operator can then select and accept one of these suggestions.

Some examples of changeable process parameters, the change of which may be suggested in the context of the instruction procedure, are, for example, feed (rate) during cutting, laser power during cutting, focus position during cutting, gas pressure within the laser machining head, and tool radius (beam cross section).

Preferably, the laser machining method is a cutting method, with the workpiece being entirely or partially severed along a cutting line. The laser beam is provided by a laser cutting head. Advantageous developments are presented in the figures and in the remaining disclosure.

A preferred version is distinguished in that a change of the process parameter, to which the suggestion relates, only takes place if the operating personnel performs an input, on an input interface, corresponding to the suggestion, or deviating from this suggestion for the process parameter. In the former case, the suggestion is confirmed. In the latter case, the operating personnel enters a different value for the relevant process parameter. This measure prevents a fully automatic adjustment of the process parameter without a checking by the user.

In a different variant, an 'acceptance' of the suggested value for the process parameter by the control could only take place fully automatically if the operator does not react within a predetermined time period.

A preferred version is distinguished in that the sensor data recorded by the at least one sensor apparatus, and/or data derived therefrom, are compared with reference data; and in that the creation of at least one suggestion for the change of a process parameter takes place as a function of the deviation of the sensor data, and/or data derived therefrom, from the reference data. The reference data can relate, for example, to the cutting quality and the desired cutting gap width for a predetermined material thickness and/or material type.

A preferred version is distinguished in that the creation of at least one suggestion for the change of a process parameter only takes place if the deviation exceeds a predetermined limit value. Consequently, it is prevented that deviations that are already small and do not impair the quality, lead to the generation of a suggestion.

A predetermined version is distinguished in that there takes place a creation of at least of one suggestion for the changing of a process parameter by means of a preferably empirically determined data set, in which possible values of the sensor data and/or data derived therefrom are linked with values for the associated process parameter. The data set is available in the control apparatus, or an external memory. An instruction program running on the control apparatus, in this case, has access to this data set, the creation of which may take place, for example, by empirical determination of optimum parameters.

A further version is distinguished in that the laser machining machine generates a suggestion for carrying out a measure, particularly a cleaning, maintenance, and/or repair measure, if at least one process parameter (e.g., primary parameter) and/or at least one analysis parameter (degree of contamination of lens and/or protective glass, cutting gap width, deviation from ideal cutting contour, fraying, etc.) relating to the machining exceeds a predetermined limit. This takes place via an expert knowledge stored in the laser machining machine, in which the most optimum procedure for every situation is linked.

A preferred version is distinguished in that the data set is changed if an input deviating from the suggestion for changing the process parameter, or a series of deviating inputs, take(s) place via the operating personnel. Here, the changing of the data set takes place as a function of the deviating input(s). This permits an adjustment of the data set, in the case of systematic deviations from suggested values, to optimum values, for example in the course of longer operating time (continuous contamination, etc.).

A preferred version is distinguished in that the sensor apparatus is constructed in order to monitor effects of the laser beam on the workpiece, particularly the cutting quality, during the laser machining process, the sensor apparatus preferably being a camera.

A preferred version is distinguished in that the sensor apparatus is constructed in order to monitor parameters relating to the laser tool during the laser machining process, the sensor apparatus preferably being a pressure sensor or optical sensor arranged in, or on, the laser machining head.

A preferred version is distinguished in that at least two parameters are monitored by the sensor apparatus during the laser machining process, and in that the parameter, to which the suggestion relates, is a parameter different from the at least two parameters monitored by the sensor apparatus. This permits a particularly reliable adjustment and optimisation of a process parameter, as the dependence of two different parameters (for example, cutting gap width and piercing duration) is incorporated into the same.

A preferred version is distinguished in that the creation of at least one suggestion for the changing of a process parameter takes place as a function of the sensor data recorded by the at least one sensor apparatus, and the provision of the suggestion for the changing of the process parameter takes place on an output interface for the operating personnel, by means of an instruction program that is contained in the control apparatus of the laser machining machine. The principle according to the present disclosure constitutes instructions for the operating personnel to find optimum parameters, and allows individually tailored solution approaches for the laser machining.

The object mentioned at the beginning may also achieved by a laser machining machine for machining a workpiece using a laser beam, having a control apparatus, wherein laser machining processes of different types may be executed using the laser machining machine. These processes are in each case controlled by the control apparatus using process parameters. The laser machining machine comprises a classification apparatus, in which the laser machining processes of different types are categorized in a classification, in which a set of process parameters, that are used during the execution of the relevant laser machining process, is assigned to each laser machining process. The classification apparatus is constructed in such a manner that during a determination and/or changing of at least one first process parameter of a laser machining process, at least one process parameter of a different laser machining process, that is contained in the classification, can automatically be determined and/or changed in accordance with at least one stored rule as a function of the first process parameter. The classification apparatus may be a configuration module, a computer or storage medium, or constituent of the control apparatus.

A preferred version is distinguished in that the laser machining machine comprises an input interface and an output interface for the operating personnel, that are connected to the control apparatus. At least one sensor apparatus for monitoring the laser machining process and/or for the inspection of a machined workpiece includes an instruction program for instructing the operating personnel, which program is constructed to generate at least one suggestion for the changing of the at least one first process parameter as a function of the sensor data recorded by the at least one sensor apparatus, and to provide the same at the output interface for the operating personnel.

This version therefore includes interactive instructions for achieving best results. The control contains the 'expert knowledge' in the form of data sets, databases and/or reference data (empirical values, tables), and provides therefrom an optimum value (from the point of view of the system) for a process parameter. The system instructs a layperson/operating personnel how to achieve a best result.

The instruction program may be a data processing program, that runs on the control apparatus, wherein the expression 'control apparatus' is to be understood broadly and can comprise all computers, modules, hardware and software required for operating the laser machining machine, in particular also external data processing devices arranged outside an intrinsic control module.

The output interface is a screen display or touch screen, but could also be of an acoustic nature (loud speaker). In the case of a screen display, this may be constructed in a straight or bent or curved manner. The latter increases the user-friendliness. The input interface is likewise not subject to any limitations and may be a keyboard, a mouse, a joystick, speech recognition and many others.

A preferred version is distinguished in that the control apparatus includes reference data, and in that the instruction program is set up in order to compare the sensor data recorded by the at least one sensor apparatus and/or data derived therefrom, with the reference data. The creation of at least one suggestion for the change of a process parameter occurs as a function of the deviation of the sensor data and/or data derived therefrom from the reference data.

A preferred version is distinguished in that the control apparatus includes a preferably empirically determined data set, in which possible values of the sensor data and/or data derived therefrom are linked with values for the associated process parameter. The instruction program is set up in order to execute the creation of at least one suggestion for the changing of a process parameter by means of the data set.

A preferred version is distinguished in that the sensor apparatus is constructed in order to monitor effects of the laser beam on the workpiece, particularly the cutting quality, during the laser machining process, this sensor apparatus preferably being a camera.

A preferred version is distinguished in that the sensor apparatus is constructed in order to monitor parameters relating to the laser tool during the laser machining process, the sensor apparatus preferably being a pressure sensor or optical sensor arranged in, or on, the laser machining head.

Further versions are described in following.

Empirically determined parameters for different laser operation types (continuous or pulsed) and machining types (cutting, engraving, etc.) may be stored for all known materials in a database in the control.

A distinction can be made between so-called primary parameters, for example, feed during cutting, laser power when cutting, focus position during cutting, gas pressure, and tool radius; and secondary parameters, that is, parameters calculated from the primary parameters. Furthermore, so-called inherited parameters may also result. Preferably, these parameters are apportioned to the categories mentioned, and in each case placed in a relationship with one another. The previously mentioned data sets result therefrom, which data sets contain a linking of the sensor data with the optimum values for the controllable process parameters.

A direction of the optimization results via an empirical linking of cutting quality (for example, faults or deviation from the ideal cut), that is determined by various sensors (cameras, radiation detectors, spectroscopy, etc.) with the parameters responsible therefor. Thus, an "offer" for "correct" parameters by the control to the user becomes possible. The latter is then free to confirm these parameters or to undertake adjustments.

As a variant, adjustments of the parameters that are to be carried out regularly may be saved and have an influence on the determination of the parameters to be offered, or the change thereof (for example, owing to the drifting away of controllers, contamination of the optics), an automatic readjustment or a notification or an entry into a log file or the like may also take place.

Further advantages, features and details of the invention result from the following description, in which exemplary versions of the invention are described with reference to the drawings. The features described may in each case be important individually, per se, or in any desired combination.

The appended reference list is part of the disclosure. The figures are described in a cohesive and comprehensive manner. The same reference symbols denote the same components, and reference symbols with different indices specify functionally identical or similar components.

BRIEF DESCRIPTION OF THE DRAWINGS

In the Figures:

FIG. 4 depicts a classification apparatus with classification system.

DETAILED DESCRIPTION

Reference in this specification to "one version," "a version," "a variant," "one variant," "one embodiment," and "an embodiment," should be understood to mean that a particular feature, structure, or characteristic described in connection with the version, variant, or embodiment is included in at least one such version, variant, or embodiment of the disclosure. The appearances of phrases "in one embodiment", "in one version," "in one variant," and the like in various places in the specification are not necessarily all referring to the same variant, version, or embodiment, nor are separate or alternative versions, variants or embodiments necessarily mutually exclusive of other versions, variants, or embodiments. Moreover, various features are described which may be exhibited by some versions, variants, or embodiments and not by others. Similarly, various requirements are described which may be requirements for some versions, variants, or embodiments but not others. Furthermore, if the specification states a component or feature "may", "can", "could", or "might" be included or have a characteristic, it should be understood that that particular component or feature is not always necessarily required to be included or have the characteristic. Additionally, as used throughout this specification, the terms 'a', 'an', 'at least' do not denote a limitation of quantity, but rather denote the presence of at least one of the referenced item, and the term 'a plurality' denotes the presence of more than one referenced items.

Figure 1:
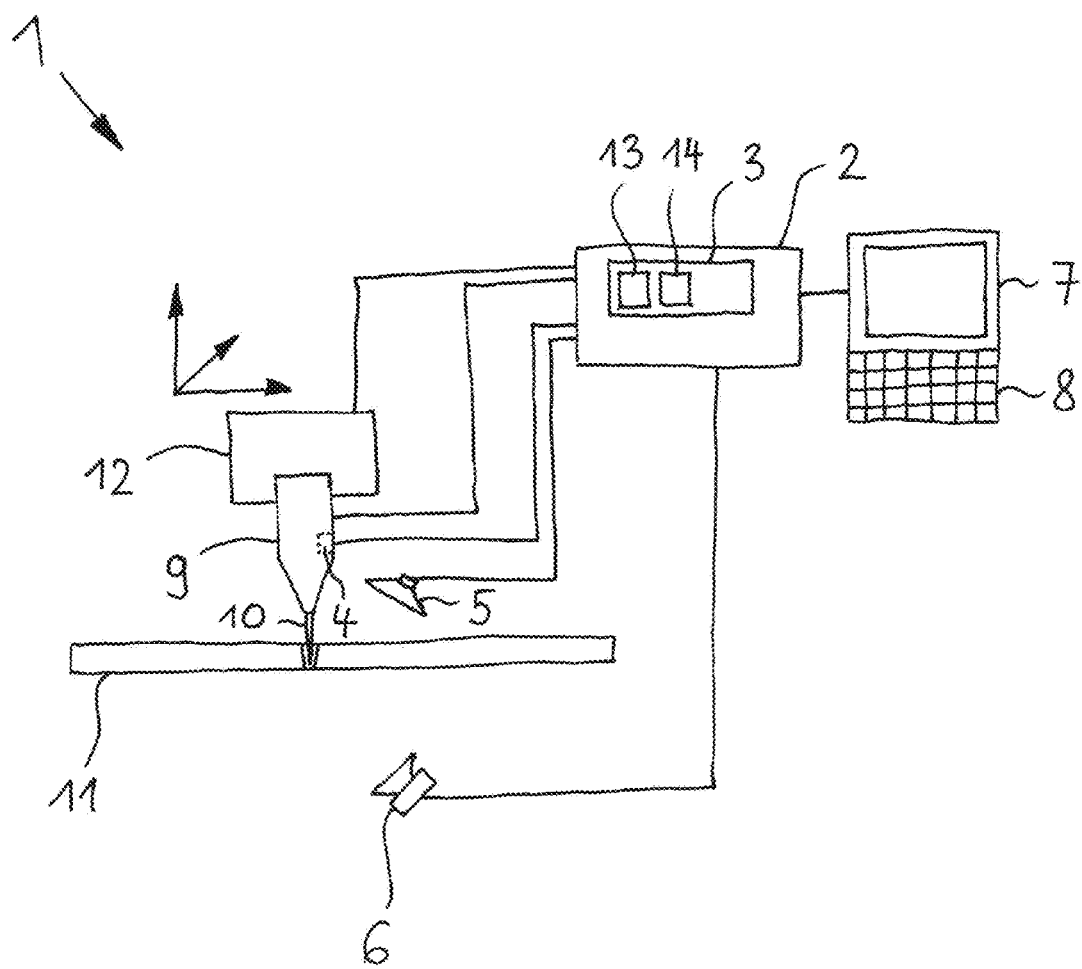
FIG. 1 depicts a laser machining machine according to the invention in schematic illustration.

FIG. 1 shows a laser machining machine 1 for machining a workpiece 11 using a laser beam 10 in the form of a laser cutting machine. This includes a control apparatus 2, via which a laser machining process may be controlled by using process parameters. Included are an input interface 8 and an output interface 7 for the operating personnel. The interfaces, respectively are connected to the control apparatus 2, and sensor apparatuses 4, 5, 6 for monitoring the laser machining process.

FIG. 4 depicts an exemplary classification apparatus 19, in which the laser machining processes of different types are categorised in a classification 20. The classification apparatus 19 may be a constituent 2 of an internal or external data memory or a specific configuration module. A set of process parameters 21A-24A, 21B-24B, etc. is assigned to each laser machining process A, B, C, D (first row of the table) by the classification 20, which process parameters are used during the execution of the relevant laser machining process.

The first column of the table from FIG. 4 describes the process parameter types: 21 describes the process parameter type: focus position; 22 describes the process parameter type: feed rate; 23 describes the process parameter type: laser power; and 24 describes the process parameter type: nozzle distance.

Thus, 21A, 21B, 21C, 21D are the actual process parameters for the focus position; 22A, 22B, 22C, 22D are the feed rate process parameters; 23A, 23B, 23C, 23D are the laser power process parameters; and, 24A, 24B, 24C, 24D are the nozzle distance process parameters for the respective laser machining types A, B, C, D.

In the illustrated version, A designates a laser machining process with a continuous laser beam, B designates a laser machining process with a pulsed laser beam, C designates a laser machining process "engraving," and D designates a laser machining process "cutting". Further machining types are, of course, conceivable and may comprise: 'continuous wave' mode (CW) for small contours, scanning, vaporization, and much more.

The classification apparatus 19 is constructed in such a manner that in the event of a determination and/or change, at least one first process parameter (e.g., 21A) of a laser machining process (e.g., A), at least one process parameter (e.g., 21B) of a different laser machining process (e.g., B) contained in the classification may be determined and/or changed in accordance with at least one stored rule as a function of the first process parameter. The first, or primary, process parameters are illustrated in FIG. 4 in 'bold' and 'italics', while the secondary parameters are shown in normal text.

Thus, the determination or changing of the at least one process parameter takes place in a class-overarching manner, as the first process parameter belongs to a different class (the classification) from the process parameter determined or changed as a function of the first process parameter. The laser machining processes of different types respectively form classes A, B, C, D (illustrated respectively as columns in FIG. 4). One laser process of a first type forms a first class of the classification; a laser process of a second type forms a second class of the classification. In this case, the first type differs from the second type in terms of quality (e.g., CW operation vs. pulsed operation). Further laser processes of different types may form further classes in each case.

In principle, primary process parameters and secondary process parameters can be defined, the secondary process parameters automatically being derived from the primary parameters, while the primary parameters are determined and/or changed by the operator or as a function of sensor data (and are therefore independent of the secondary parameters to a certain extent). In FIG. 4, the primary or first process parameters are additionally illustrated in a highlighted manner ('bold' and 'italics'). The actual selection or assignment of the primary parameters can basically also be different, depending on the requirement. A change of this definition is, of course, possible.

In the case of a determination and/or change at least of a first (primary) process parameter of a laser machining process, at least one (secondary) process parameter of a different laser machining process contained in the classification is then automatically determined and/or changed in accordance with at least one stored rule as a function of the first process parameter. As already mentioned, the set of process parameters assigned to each laser machining process A, B, C, D may comprise the process parameters focus position and/or feed rate and/or laser power and/or nozzle distance from the workpiece 11.

Figure 5:
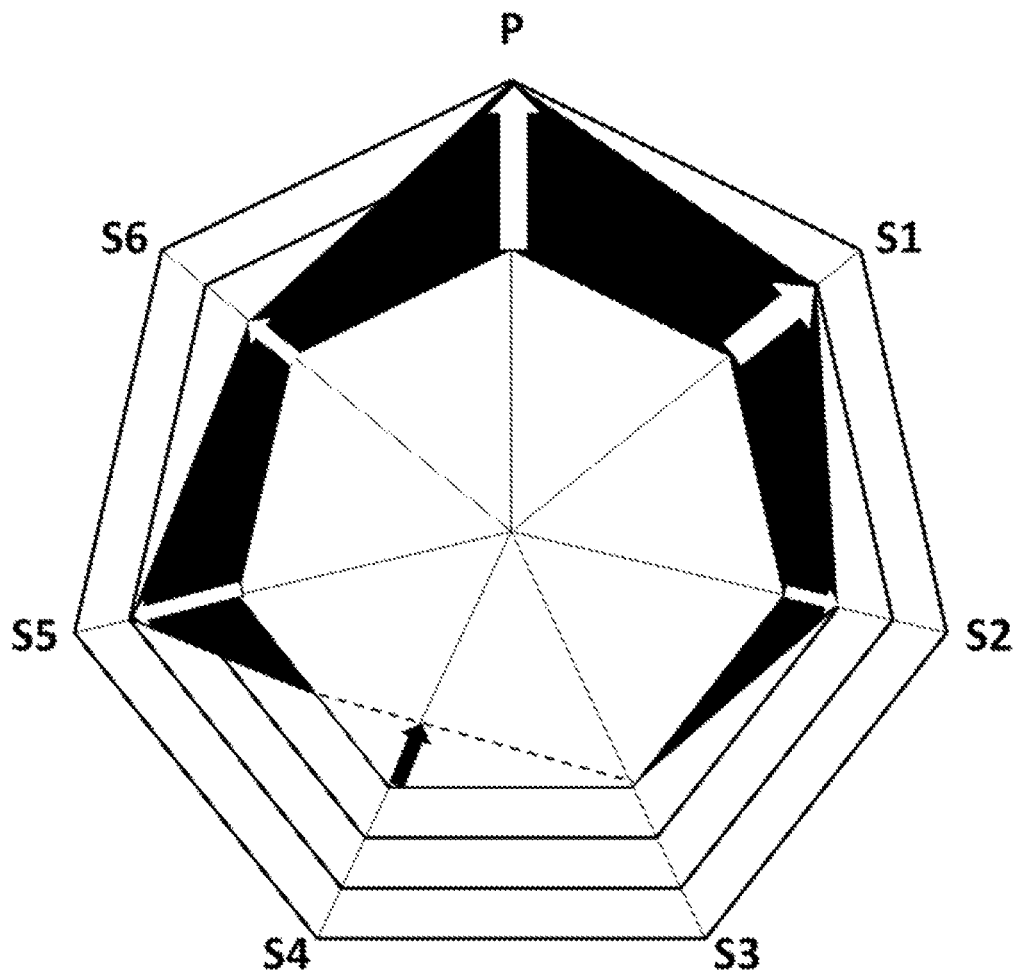
FIG. 5 depicts a rule for generating process parameters converted to a graphical illustration.

FIG. 5 depicts the dependence relationships (according to the stored rules) of secondary process parameters S1 . . . S6 on a primary process parameter P. Multiple dependencies are likewise conceivable, for example the process parameter 21B focus position could depend on the primary parameters 21A and 22A.

The at least one stored rule can preferably be changed via an input interface 8.

Preferably, the determination and/or changing of at least one first (primary) process parameter P takes place by means of an input at an input interface 8 of the laser machining machine 1 by an operator.

In this context, a plurality of images of workpieces of different machining quality could be displayed on an output interface 7 of the laser machining machine 1, wherein each image is assigned to a certain value of at least one first process parameter. The determination and/or changing of the at least one first process parameter then takes place by operator selection of one of the images. The system thereby achieves knowledge of the effects of a certain process parameter, and can change the same in order to improve the machining quality.

The determination and/or changing at least of one first process parameter may also take place as a function of sensor data of a sensor apparatus 4, 5, 6, as is described in more detail below.

The assessment of the machining or cutting quality can also take place without a sensor, specifically only via the optical assessment of the cut face by the operator. This way, a part is cut and is compared as to the quality with various, illustrated qualities on the screen display. Then the operator may press on the closest image. The control could then make at least one suggestion for a change from this information. This process may, however, also be supported further by at least one sensor apparatus.

Such an optimization process initially only relates to the (important) primary process parameters. If these are determined, the values for the secondary parameters are automatically calculated using the stored rules on the control apparatus or a memory location (this could also be outside the machine), and the entire data set is stored. The production then starts using this complete data set. With this step, expenditure of operator's effort is saved and operators do not have to have deep technical understanding.

The fully automatic determination of the primary process parameters using at least one sensor without interaction of an operator is likewise conceivable. In this case, the sensors also asses only the primary parameters or the effects thereof on the machining quality, and the secondary parameters are calculated according to the stored rules.

A sensor apparatus (e.g., camera) does not necessarily have to be used during the laser process, but rather could also be used only subsequently. However, such a sensor is also connected to the control and forwards the information directly.

Example

The sectioned sample is removed from the machine and the cut face is held before a camera. This assesses the roughness and the burr formation, and transmits this information to the control. These properties are then compared with stored values, and an adjustment of the process parameters is suggested on the basis of the deviation.

Further Example

A cut-out bore is recorded by the camera (after the cutting process, within or outside the cutting installation) and the diameter is determined (using appropriate image processing software). The determined diameter is compared with the programmed (i.e., ideal) diameter, and the deviation is suggested as a suggestion for the adjustment of the process parameters. This process could, however, also run fully automatically, e.g. in that the camera independently measures the first bore and then already uses the necessary parameter adjustment from the second hole on.

The sensor apparatus, with the sensor data of which a determination or changing of the primary parameters is to take place, could also be provided outside the laser machining machine. Thus, an investigation of a machined workpiece may also take place outside of the laser machining machine.

If a specified deviation of the operator or a sensor is too large (compared to the stored data), the system suggests a check or warning. Example: The operator cuts a part, that has a burr on the underside of the metal sheet. They press the corresponding image, and the installation suggests that they place the focus position 1 mm deeper. They confirm this, and cut the next part, which in turn has a burr (possibly somewhat less). They repeat this five times without significant improvement. After the fifth time, the installation suggests that they clean the lens, as this is presumably the reason for the large deviation. Thus, in addition to the control-supported determination of process parameters, the plausibility is also checked, and a possible cause to be overcome is suggested. This process also tends to relieve the operator of the burden of expert knowledge and contexts.

An actual example is described in following.

The control apparatus 2 includes an instruction program 3 for instructing the operating personnel, which is designed in order to create at least one suggestion for the change of a process parameter as a function of the sensor data recorded by the at least one sensor apparatus 4, 5, 6, and to provide the same at the output interface 7 for the operating personnel.

The sensor apparatuses 4, 5, 6 are constructed in order to monitor the effects of the laser beam 10 on the workpiece 11, particularly the cutting quality, during the laser machining process. The sensor apparatus 6 may preferably be a camera.

At least one sensor apparatus 4 is constructed in order to monitor parameters relating to the laser tool during the laser machining process, this sensor apparatus 4 preferably being a pressure sensor or optical sensor arranged in, or on, the laser machining head 9.

A sensor apparatus 4 of the illustrated embodiment, for example an optical sensor, is arranged in the laser machining head 9 and monitored, for example as to the cutting quality and/or the laser cross section. A sensor apparatus of this type is illustrated in detail in FIG. 3. A drive unit 12 (only illustrated schematically) is used for the method of the laser machining head 9 in all spatial directions. Further sensor apparatuses 5, 6 may be provided in order to monitor the cutting quality from outside the laser head 9, for example above and below the workpiece 11.

Figure 3:
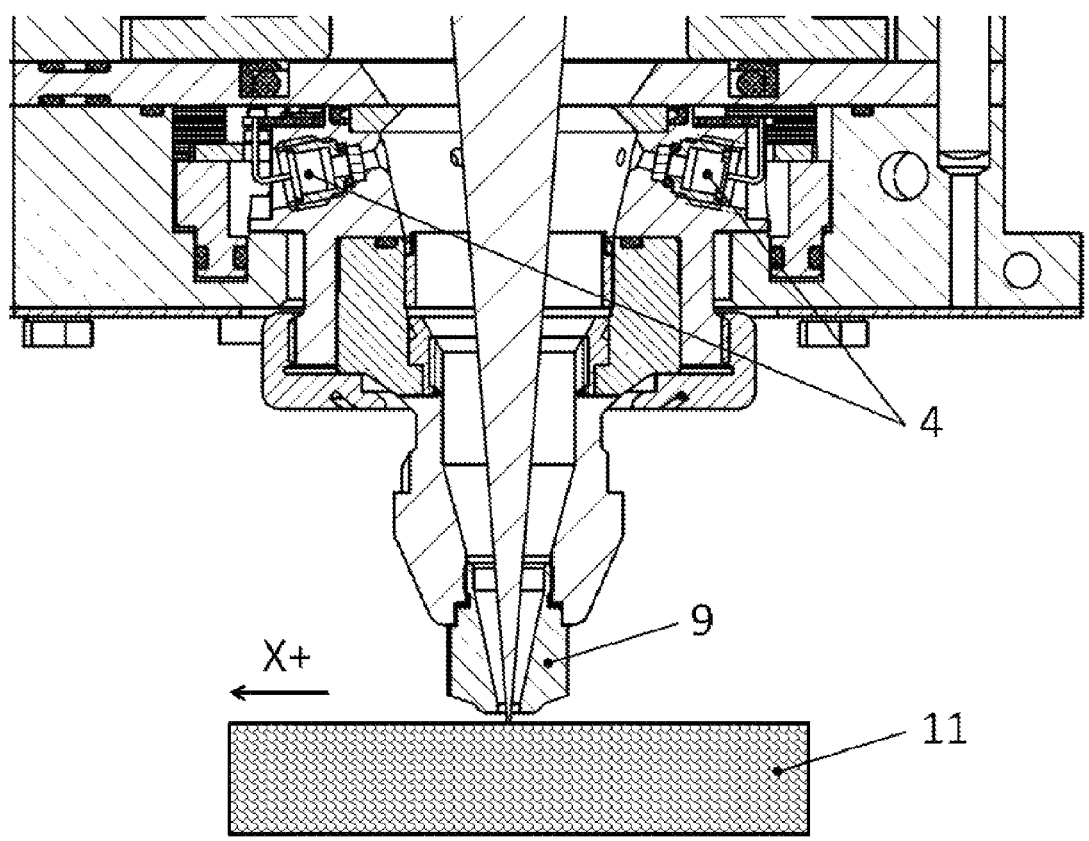
FIG. 3 depicts a laser machining head in section.

FIG. 3 shows an optical sensor 4 within the laser machining head 9, which measures the cut gap width. To this end, a light of a diode is directed via a diverting mirror in the direction of the nozzle opening. The cutting region illuminated by the diode is recorded by an opposite optical sensor, that detects the reflected light likewise diverted via a diverting mirror.

The control apparatus 2 includes reference data 13, and the instruction program 3 is set up in order to compare the sensor data recorded by the at least one sensor apparatus 4, 5, 6, and/or data derived therefrom, with the reference data 13. The creation of at least one suggestion for the change of a process parameter takes place as a function of the deviation of the sensor data and/or data derived therefrom from the reference data 13.

The control apparatus 2 also comprises a preferably empirically determined data set 14, in which possible values of the sensor data and/or data derived therefrom with values for the associated process parameter. The instruction program 3 is set up in order to carry out at least one suggestion for the changing of a process parameter by means of the data set 14.

Figure 2:
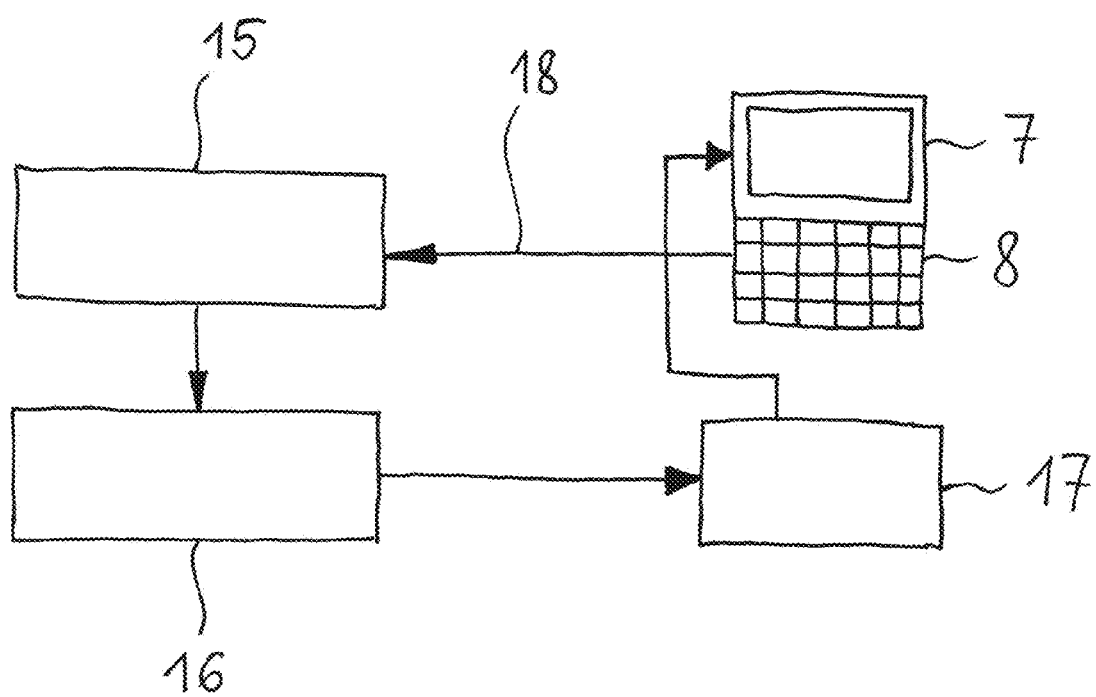
FIG. 2 depicts a laser machining method according to the invention in schematic illustration.

The laser machining process for machining a workpiece 11 using a laser beam 10 in a laser machining machine 1 is now described in detail on the basis of FIG. 2.

Method step 15 includes the control of a laser machining process with the control apparatus 2 using process parameters.

Parallel to this, in method step 16, a monitoring of the laser machining process takes place using at least one sensor apparatus 4, 5, 6.

In method step 17, there is a creation/generation of at least one suggestion for the changing of a process parameter as a function of the sensor data recorded by the at least one sensor apparatus 4, 5, 6.

The suggestion for the changing of the process parameter is provided at an output interface 7 for the operating personnel, for example displayed at a screen display.

The input interface 8 then receives the input of the operator. Preferably, a changing of the process parameter (method step 18), to which the suggestion relates, preferably takes place only if the operating personnel carries out an input corresponding to the suggestion or an input deviating from the suggestion for the process parameter on the input interface 8 of the laser machining machine 1.

In a preferred version, the sensor data recorded by the at least one sensor apparatus 4, 5, 6 and/or data derived therefrom are compared with reference data 13. The creation of at least one suggestion for the change of a process parameter takes place as a function of the deviation of the sensor data and/or data derived therefrom from the reference data 13.

In this case, it can be provided that the creation at least of one suggestion for the changing of a process parameter only takes place if the deviation exceeds a predetermined limit value.

The creation at least of one suggestion for the changing of a process parameter takes place preferably by means of a preferably empirically determined data set 14, in which possible values of the sensor data, and/or data derived therefrom, are linked with data for the associated process parameter.

An optional enhancement involves changing the data set 14 if an input deviating from the suggestion for changing the process parameter, or a series of deviating inputs, take(s) place by the operating personnel. The changing of the data set takes place as a function of the deviating input(s). This can take place automatically or after confirmation or setting by the operator.

At least two parameters can also be monitored by sensor apparatuses 4, 5, 6 during the laser machining process (for example, cutting gap width and piercing duration). The process parameter, to which the suggestion suggested by the system relates, is in this case a process parameter (for example, the laser power or the feed rate) different from the at least two parameters monitored by the sensor apparatuses 4, 5, 6.

As already mentioned, the method takes place utilizes an instruction program 3, which is contained in the control apparatus 2 of the laser machining machine 1. The instruction program is used for creating a human/machine interface, by which the operator can interactively influence the machining/cutting process.

The scope of the present disclosure should be understood as not merely limited to the described embodiments and the aspects highlighted therein. Rather, within the scope of the present disclosure, a multiplicity of modifications, which lie in the context of an experienced reader's trade, is possible. Likewise, it is possible by combining the features mentioned, to realize further design variants without leaving the context of the present disclosure and the scope of protection. Finally, it may be mentioned that the invention relates to all possible machining types, particularly piercing, cutting, engraving, vaporization, welding, and many more.

In closing, it should be noted that the above description is intended to illustrate rather than limit the invention, and that those skilled in the art shall be capable of designing many alternative embodiments without departing from the scope of protection of invention as defined by the appended claims. As equivalent elements can be substituted for elements employed in claimed invention so as to obtain substantially the same results in substantially the same way, the scope of the present invention is defined by the appended claims, including known equivalents and unforeseeable equivalents at the time of filing of this application. Furthermore, in the claims, the verb 'comprise' and its conjugations do not exclude the presence of elements or steps other than those listed in any claim or the specification as a whole. The singular reference of an element does not exclude the plural reference of such elements and vice-versa. The mere fact that certain measures are recited in mutually different dependent claims does not necessarily indicate that a combination of these measures cannot be used to advantage.

LIST OF REFERENCE LABELS

1 Laser machining machine
2 Control apparatus
3 Instruction program
4 Sensor apparatus
5 Sensor apparatus
6 Sensor apparatus
7 Output interface
8 Input interface
9 Laser machining head
10 Laser beam
11 Workpiece
12 Drive unit
13 Reference data
14 Data set
15 Method step: Controlling a laser machining process
16 Method step: Monitoring the laser machining process
17 Method step: Creation of a suggestion
18 Method step: Changing of the process parameter
19 Classification apparatus
20 Classification
21 Process parameter type: Focus position
22 Process parameter type: Feed rate
23 Process parameter type: Laser power
24 Process parameter type: Nozzle distance
21A, 21B, 21C, 21D Focus position process parameter
22A, 22B, 22C, 22D Feed rate process parameter
23A, 23B, 23C, 23D Laser power process parameter
24A, 24B, 24C, 24D Nozzle distance process parameter
A Laser machining process with a continuous laser beam
B Laser machining process with a pulsed laser
C Engraving laser machining process
D Cutting laser machining process
P Primary process parameter
S1-S6 Secondary process parameter

What is claimed is:

1. A method of operating a laser machining machine comprising the steps of:
   providing a classification with a plurality of different classes of laser machining processes, with each of the plurality of different classes including at least one defined laser machining process;
   providing a respective set of process parameters as respective characteristics for each respective one of the plurality of different classes of laser machining processes;
   establishing at least one first process parameter of a first respective class of laser machining process; and,
   automatically establishing at least one respective process parameter of at least a second respective class of laser machining process based on at least one stored rule as a function of said at least one first process parameter of the first respective class of laser machining process.

2. The method of operating a laser machining machine as claimed in claim 1, further comprising the steps of:
   providing a respective set of process primary parameters as respective characteristics for each respective one of the plurality of different classes of laser machining processes; and,
   providing a respective set of process secondary parameters as respective characteristics for at least one of the plurality of different classes of laser machining processes, in accordance with stored rules as a function of at least one primary parameter.

3. The method of operating a laser machining machine as claimed in claim 2, further comprising the step of: changing at least one primary parameter based on sensor data.

4. The method of operating a laser machining machine as claimed in claim 1, further comprising the step of: providing a classification with a plurality of different classes of laser machining processes and including at least one laser machining process employing continuous laser radiation and at least one laser machining process employing laser radiation.

5. The method of operating a laser machining machine as claimed in claim 1, further comprising the step of: providing a classification with a plurality of different classes of laser machining processes and including at least one laser machining process selected from the group consisting of cutting, engraving, scanning, vaporization, and continuous cutting of small contours.

6. The method of operating a laser machining machine as claimed in claim 1, further comprising the step of: providing a respective set of process primary parameters as respective characteristics for each respective one of the plurality of different classes of laser machining processes and providing for at least one of the plurality of different classes at least one process parameter selected from the group consisting of focus position, feed rate, laser power, and nozzle distance from workpiece.

7. The method of operating a laser machining machine as claimed in claim 1, further comprising the step of: changing the at least one stored rule.

8. The method of operating a laser machining machine as claimed in claim 1, further comprising the steps of:
   displaying a plurality of respective workpiece images on an output interface;
   assigning each of said plurality of respective workpiece images to at least one respective certain value of at least one respective process parameter; and,
   providing an actual process parameter value by selecting at least one of said plurality of workpiece images.

9. A laser machining process comprising the steps of:
   providing a classification with a plurality of different classes of laser machining processes, with each of the plurality of different classes including at least one defined
   laser machining process;

providing a respective set of process parameters as respective characteristics for each respective one of the plurality of different classes of laser machining processes;

establishing at least one first process parameter of a first respective class of laser machining process;

automatically establishing at least one respective process parameter of at least a second respective class of laser machining process based on at least one stored rule as a function of said at least one first process parameter of the first respective class of laser machining process; and, controlling laser machining with a controller employing the process parameters.

10. The laser machining process as claimed in claim 9 further comprising the steps of:

monitoring laser machining with at least one sensor;

creating at least one suggestion, based on sensor data from the at least one sensor, for the changing of a process parameter: and, providing the at least one suggestion to an output interface.

11. The laser machining process as claimed in claim 9 further comprising the steps of:

monitoring laser machining with at least one sensor;

comparing with reference data, values that are based on sensor data; and, creating at least one suggestion, based on sensor data from the at least one sensor, for the changing of a process parameter, as a function of a deviation derived from said step of comparing with reference data values based on sensor data.

12. The laser machining process as claimed in claim 9 further comprising the steps of:

monitoring laser machining with at least one sensor;

creating at least one suggestion for the changing of a process parameter by employing an empirically determined data set; and, in the empirically determined data set linking possible values of sensor-based data with respective values for associated process parameter.

13. The laser machining process as claimed in claim 9 further comprising the step of: creating at least one suggestion for a machine care measure when at least one process parameter exceeds a predetermined limit.

14. The laser machining process as claimed in claim 9 further comprising the step of: creating at least one suggestion for a machine care measure when at least one machining-related analytical parameter exceeds a predetermined limit.

15. The laser machining process as claimed in claim 9 further comprising the steps of:

monitoring laser machining with at least one sensor;

creating at least one suggestion, based on sensor data from the at least one sensor, for the changing of a process parameter;

employing an instruction program contained in the controller to provide the at least one suggestion to an output interface.

16. The laser machining process as claimed in claim 9 further comprising the steps of:

providing a respective set of process primary parameters as respective characteristics for each respective one of the plurality of different classes of laser machining processes; and, providing a respective set of process secondary parameters as respective characteristics for at least one of the plurality of different classes of laser machining processes, in accordance with stored rules as a function of at least one primary parameter.

17. A laser machining machine comprising:

a laser beam generator in said laser machining machine;

a controller operatively connected to control said laser machining machine;

said laser machining machine including a classification apparatus containing a classification with a plurality of different classes of laser machining processes with each of the plurality of different classes including at least one defined laser machining process, and also containing a respective set of process parameters as respective characteristics for each respective one of the plurality of different classes of laser machining processes; and, electronic structure configured to automatically establish at least one first process parameter of at least a first respective class of laser machining process electronic structure being further configured to automatically establish at least one respective process parameter of at least a second respective class of laser machining process based on at least one stored rule as a function of said at least one first process parameter of the first respective class of laser machining process;

said electronics structure being operatively associated with said classification apparatus.

18. The laser machining machine as claimed in claim 17, further comprising:

an input interface operatively connected to said controller;

an output interface operatively connected to said controller;

at least one sensor configured to monitor machining; and, said controller including a set of stored program instructions that generate at said output interface at least one suggestion for process parameter change based on operative communication of said at least one sensor.

19. The laser machining machine as claimed in claim 17, wherein: said classification apparatus contains a respective set of process primary parameters as respective characteristics for each respective one of the of different classes of machining processes, and also contains a respective set of process secondary parameters as respective characteristics for at least one of the plurality of different classes of machining processes in accordance with stored rules as a function of at least one primary parameter.

20. The laser machining machine as claimed in claim 19, wherein: said electronic structure has structure configured to automatically change a value of at least one process secondary parameter as a function of a change in value of at least one primary process parameter.

* * * * *